US011964597B2

(12) United States Patent
Holder et al.

(10) Patent No.: US 11,964,597 B2
(45) Date of Patent: Apr. 23, 2024

(54) VEHICLE SEAT (71) Applicant: ADIENT ENGINEERING AND IP GMBH, Burscheid (DE)

(72) Inventors: Brian S. Holder, Livonia, MI (US); Joseph B. A. Rajkumar, Ypsilanti, MI (US); Jeffrey P. Medvecky, Novi, MI (US); Mark F. Kowalski, Belleville, MI (US)

(73) Assignee: Adient US LLC, Plymouth, MI (US)

( * ) Notice: Subject to any disclaimer, the term of this patent is extended or adjusted under 35 U.S.C. 154(b) by 455 days.

(21) Appl. No.: 17/292,019

(22) PCT Filed: Nov. 18, 2019

(86) PCT No.: PCT/EP2019/081576
§ 371 (c)(1),
(2) Date: May 7, 2021

(87) PCT Pub. No.: WO2020/104346
PCT Pub. Date: May 28, 2020

(65) Prior Publication Data
US 2021/0394650 A1   Dec. 23, 2021

Related U.S. Application Data (60) Provisional application No. 62/769,013, filed on Nov. 19, 2018.

(51) Int. Cl.
*B60N 2/16* (2006.01)
*B60N 2/12* (2006.01)
*B60N 2/04* (2006.01)
(52) U.S. Cl.
CPC ............ *B60N 2/1695* (2013.01); *B60N 2/12* (2013.01); B60N 2/045 (2013.01); B60N 2/1615 (2013.01); B60N 2/1645 (2013.01)

(58) Field of Classification Search
CPC ...... B60N 2/1695; B60N 2/12; B60N 2/1645; B60N 2/1615; B60N 2/045
See application file for complete search history.

(56) References Cited

U.S. PATENT DOCUMENTS

2018/0370635 A1* 12/2018 Itzinger .............. B64D 11/0648

FOREIGN PATENT DOCUMENTS

CN      104736383 A     6/2015
CN      106573553 A     4/2017
(Continued)

OTHER PUBLICATIONS

FR-2969057-A1 computer translation (Year: 2012).*
(Continued)

*Primary Examiner* — Amy R Weisberg
*Assistant Examiner* — Melissa Ann Bonifazi
(74) *Attorney, Agent, or Firm* — Marshall & Melhorn, LLC (57) ABSTRACT A vehicle seat, such as for a motor vehicle seat, adapted to be transferable from at least one use position, which is suitable for transporting a passenger, into an easy entry position as a non-use position, and back, may have a seat cushion, a backrest, and a seat frame. The seat cushion and the backrest may be coupled to the seat frame, a base and a kinematics for the articulated connection of the seat frame to the base. The kinematics may have at least one link articulated connecting the seat frame to the base. The at least one link may be lockable by a disc shaped fitting or the at least one link may be lockable with the seat frame by a locking device.

5 Claims, 7 Drawing Sheets (56) References Cited

FOREIGN PATENT DOCUMENTS

| | | | |
|---|---|---|---|
| DE | 10 2013 006 485 | 11/2013 | |
| EP | 0 029 997 A1 | 6/1981 | |
| EP | 1 055 549 A1 | 11/2000 | |
| FR | 2 969 057 A1 | 6/2012 | |
| FR | 2969057 A1 * | 6/2012 | ............ B60N 2/045 |
| WO | 2001/12461 | 2/2001 | |
| WO | 2004/069580 | 2/2004 | |
| WO | 2007/039002 | 4/2007 | |
| WO | 2009/127290 A1 | 10/2009 | |
| WO | 2010/091816 A1 | 8/2010 | |
| WO | 2018/046433 A1 | 3/2018 | |

OTHER PUBLICATIONS

PCT International Search Report and Written Opinion (PCT/EP2019/081576).

China National Intellectual Property Administration, Office Action in Application No. CN201980075673.4, dated Sep. 2, 2022, 13 pages.

* cited by examiner

VEHICLE SEAT

The present invention relates to a vehicle seat, in particular motor vehicle seat, which is transferable from at least one use position, which is suitable for transporting a passenger, into an easy entry position, as a non-use position, and back, comprising a seat cushion and a backrest, a seat frame, the seat cushion and the backrest being coupled to the seat frame, a base, a kinematics, in particular a four bar linkage, for the articulated connection of the seat frame to the base, wherein the kinematics comprises at least one link articulated connecting the seat frame to the base.

BACKGROUND OF THE INVENTION

DE 10 2013 006 485 A1 discloses a seat having a translation guide unit with an opening in which an axle is inserted. A blocking unit controls the rotation of a receiving assembly in relation to a rail and the displacement of axle in the opening when the receiving assembly is in a nominal position. The anchoring elements of a locking unit anchor the receiving assembly on the rail in nominal positions, corresponding to a possible longitudinal adjustment of the seat. A locking element targets one of the anchoring elements when the receiving assembly is displaced in one nominal position.

WO 2018/046433 A1 discloses a vehicle seat, in particular a motor-vehicle seat, which can be transferred from at least one usage position suitable for transporting a person to at least one non-usage position, comprising a seat cushion having a seat cushion support, a backrest, a base, which can be connected to a vehicle, a rocker, which is pivotably connected by means of a first joint to the base or to a component fixedly connected to the base and is pivotably connected by means of a second joint to the seat cushion support of the seat cushion, a rear foot, which is pivotably connected by means of a third joint to the base or to a component fixedly connected to the base, wherein pivoting motion of the rear foot about the third joint can be locked, and wherein the rear foot is pivotably connected by means of a fourth joint to the backrest, a fifth joint, which connects the backrest to the seat cushion support, wherein at least one of the joints is a fitting.

SUMMARY OF THE PRESENT INVENTION

It is an object of the present invention to provide an improved vehicle seat. A potential occupant injury (pinch points) shall be avoided. Vehicle seats known from state of the art lift up during a transition in the easy entry position. For a transition in the use position the vehicle seat must be secured back to the floor by pushing the vehicle seat down to a floor striker, which could potentially trap or wedge occupant feet between a bottom of a seat latch and the floor striker.

The object is achieved by a vehicle seat, in particular motor vehicle seat, which is transferable from at least one use position, which is suitable for transporting a passenger, into an easy entry position as a non-use position, and back, comprising a seat cushion, a backrest, a seat frame, the seat cushion and the backrest being coupled to the seat frame, a base and a kinematics for the articulated connection of the seat frame to the base, wherein the kinematics comprises at least one link articulated connecting the seat frame to the base. The at least one link is lockable by a disc shaped fitting.

Preferably, the kinematics is a four bar linkage. The four bar linkage may comprise a front link and a rear link. The front link may be connected to the base by a first swivel joint and may be connected to the seat frame by a second swivel joint. The rear link may be connected to the base by a third swivel joint and the rear link being connected to the seat frame by a fourth swivel joint. Preferably, the third swivel joint is formed by the fitting.

The fitting may be a detent fitting. The fitting may comprise a first fitting part, a second fitting part rotatable about an axis in relation to the first fitting part, and at least a locking device for locking the rotation between the first fitting part and the second fitting part.

The fitting may be a geared fitting. The fitting may comprise a first fitting part and a second fitting part, which are rotatable relative to each other and which are in geared connection with each other by means of a toothed ring and a gear wheel meshing with the toothed ring, and an eccentric intended for driving a relative rolling movement of the gear wheel and the toothed ring.

A vehicle seat according to the invention does not expose any latch or sticker during the transitioned from a use position to an easy entry position and vice versa and is designed such that the locking mechanisms can be completely covered during motion. A risk of injury is avoided. A cover may cover the fitting and at least partly the base. The at least one link may be pivotable relative to the cover.

Furthermore, the object is achieved by a vehicle seat, in particular motor vehicle seat, which is transferable from at least one use position, which is suitable for transporting a passenger, into an easy entry position as a non-use position, and back, comprising a seat cushion, a backrest, a seat frame, the seat cushion and the backrest being coupled to the seat frame, a base, and a kinematics for the articulated connection of the seat frame to the base, wherein the kinematics comprises at least one link articulated connecting the seat frame to the base. The at least one link is lockable with the seat frame by a locking device.

Preferably, the kinematics is a four bar linkage. The four bar linkage may comprise a front link and a rear link. The front link may be connected to the base by a first swivel joint and may be connected to the seat frame by a second swivel joint. The rear link may be connected to the base by a third swivel joint and the rear link being connected to the seat frame by a fourth swivel joint. Preferably, the third swivel joint is formed by the fitting.

The locking device may be designed as a rotary latch lock for receiving and locking a counter element. The counter element may be a bolt. The counter element may be a wire. The counter element may be a bracket.

Preferably, the locking device is fixedly connected to the seat frame and the counter element is fixedly connected to the at least one link. The counter element may be fixedly connected to the rear link. Alternatively, the locking device may be fixedly connected to the at least one link and the counter element is fixedly connected to the seat frame.

If the counter element is arranged in a U-shaped region of the at least one link, a risk of injury is avoided, because the counter element does not protrude. A cover may cover the locking device and at least partly the rear link. The rear link may be pivotable relative to the cover.

BRIEF DESCRIPTION OF THE DRAWINGS

The invention is explained in more detail below with reference to advantageous exemplary embodiments which are illustrated in the figures. However, the invention is not restricted to these exemplary embodiments.

In the figures.

DETAILED DESCRIPTION OF PREFERRED EMBODIMENTS

Referring to the drawings, vehicle seats 100, 200 are described below in a Cartesian coordinate system which is defined by three spatial directions that are perpendicular to one another. When a vehicle seat 100, 200 is installed in the vehicle, a longitudinal direction x runs substantially horizontally and preferably parallel to a longitudinal direction of the vehicle, which corresponds to the usual direction of travel of the vehicle. A transverse direction y running perpendicularly to the longitudinal direction x is likewise oriented horizontally in the vehicle and runs parallel to a transverse direction y of the vehicle. A vertical direction z runs perpendicularly to the longitudinal direction x and perpendicularly to the transverse direction y. A vertical arrangement should be understood as meaning an arrangement which runs parallel to the vertical direction z. When a vehicle seat 100, 200 is installed in the vehicle, the vertical direction z runs parallel to the vertical axis of the vehicle.

The position and direction specifications used, for example front, rear, top and bottom, relate to a viewing direction of an occupant of a vehicle seat 100, 200 in a normal sitting position, wherein the vehicle seat 100, 200 is oriented as usual in the direction of travel. However, a vehicle seat 100, 200 according to the invention can also be installed in some other orientation, for example transversely with respect to the direction of travel.

FIGS. 1 to 6 show a vehicle seat 100 according to a first embodiment of the invention. The vehicle seat 100 is provided, for example, as an outer seat of a middle or rear seat row of a motor vehicle, for example a van. The vehicle seat 100 has a seat cushion 102 and a backrest 104. The backrest 104 is located at the rear end of the seat cushion 102.

The vehicle seat 100 can be transitioned from a use position to an easy entry position and vice versa. The use position is suitable for transporting a passenger. In the easy entry position, the backrest 104 is in a more upright position and the seat cushion 102 and the backrest 104 are arranged further forward in comparison to the use position.

The backrest 104 is adjustable in its inclination around a swivel axis by means of at least one first fitting 106, in the present case two first fittings 106. Thereby a plurality of use positions of the vehicle seat 100 with different inclinations of the backrest 104 are defined. The two first fittings 106 are designed as detent fittings which are known from WO 2007/039002 A2 for example, but, in particular in the case of an electrified vehicle seat, could also be designed as geared fittings, which are known from WO 01/12461 A1 for example.

The seat cushion 102 is intended to be understood as meaning, in the present case, a seat cushion carrier and a covered pad. The seat cushion 102 is fixed to a seat frame 108, the seat frame 108 comprising two seat frame side members 110 which are oriented broadly parallel to the longitudinal direction x and two cross tubes or crossmembers which connect the seat frame side members 110. The backrest 104 is fixed on the seat frame 108 by the two first fittings 106.

For simplicity, in the following, only the left vehicle seat side of the vehicle seat 100, which is substantially symmetrical with respect to a plane running parallel to the longitudinal direction and vertically to the transverse direction y, is described, i.e. the components mentioned below, unless described differently, are present in duplicate (optionally mirror-symmetrically). The vehicle seat 100 is first of all described in a special use position, namely the design position, in which the backrest 5 is inclined slightly to the rear, in the present case by approximately 22°, in relation to the vertical direction z.

A base 112 of the vehicle seat 100 is connectable to a vehicle structure of the motor vehicle, for example to the floor of the vehicle body. In the exemplary embodiment, the base 112 is designed as a seat rail arrangement which enables the possibility of a longitudinal adjustment of the vehicle seat 100. In the present case, the base 112 has a first seat rail 114 which is connectable directly to the vehicle structure, and a second seat rail 116 which is displaceable in the longitudinal direction relative to said first seat rail 114. The two seat rails 114 and 116, which have a substantially U-shaped profile, engage one behind the other in an alternating manner by their inwardly and outwardly curved longitudinal edges and are lockable to each other—by means of a rail lock which is known per se.

The seat frame 108 is coupled to the second seat rail 116 by means of a four bar linkage 118. The four bar linkage 118 comprises a front link 120 and a rear link 122. A first swivel joint I connects the front link 120 to a front adaptor 124. The front adaptor 124 is fastened to the second seat rail 116, in particular to a front area of the second seat rail 116. A second swivel joint II connects the front link 120 to the seat frame 108, in particular to a front area of the seat frame side member 110.

The rear link 122 is fastened to a first fitting part of a second fitting 126. The second fitting 126 comprises the first fitting part and a second fitting part which is rotatable relative to the first fitting part. If the second fitting 126 is configured as a detent fitting, the first fitting part and the second fitting part can be locked to one another. If the second fitting 126 is configured as a gear mechanism fitting, the two fitting parts are connected to one another by a gear mechanism for adjustment and fixing in position. The second fitting is adjustable by a rotation of a drive element, for example effecting a relative rolling movement of the two fitting parts. The second fitting 126 is a disc shaped fitting as it is known, for example, from US 2010/0060063 A1. The second fitting part of the second fitting 126 is connected to a rear adapter 128. The rear adapter 128 is fixedly connected to the second seat rail 116, in particular to a rear area of the second seat rail 116. The second fitting 126 works as a third swivel joint III of the four bar linkage 118.

A fourth swivel joint IV connects the rear link 122 to the seat frame 108, in particular to a rear area of the seat frame side member 110.

For the transfer of the vehicle seat 100 from the use position into the easy entry position, the second fitting 126 is adjusted in such a way that the rear link 120 pivots around the third swivel joint III and moves the seat frame 108 in a more forward direction. If the second fitting 126 is configured as a detent fitting, the second fitting 126 is unlocked for the transfer of the vehicle seat 100 from the use position into the easy entry position. If the second fitting 126 is configured as a gear mechanism fitting, the drive element is driving a relative rolling movement of the two fitting parts of the second fitting 126.

During the transition from the use position into the easy entry position, the locking of the seat rails 114 and 116 can be unlocked and therefore the second seat rail 116 is movable forward, which additionally increases the space behind the vehicle seat 100, i.e. an entry size, and facilitates the access to a rear seat row behind the vehicle seat 100. When the easy entry position, in which the access to the rear seat row behind the vehicle seat 100 is facilitated, is reached, an additional locking device, which is not shown in the figures, can optionally secure the easy entry position. The return into the previously adopted use position takes place in the reverse order.

For a transfer of the vehicle seat 100 from the use position into a floor position as a further non-use position in which an increased loading space is available, the backrest 104 is folded forward after the first fitting 106 is unlocked or adjusted accordingly. Preferably the rail lock remains locked in the floor position.

Figure 1:
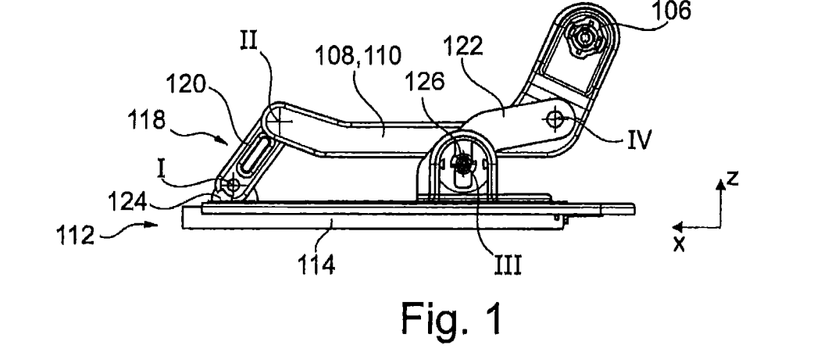
FIG. 1 shows a side view of a vehicle seat according to a first embodiment of the invention in a use position, wherein a backrest, and a seat cushion of the vehicle seat are not shown.
Figure 2:
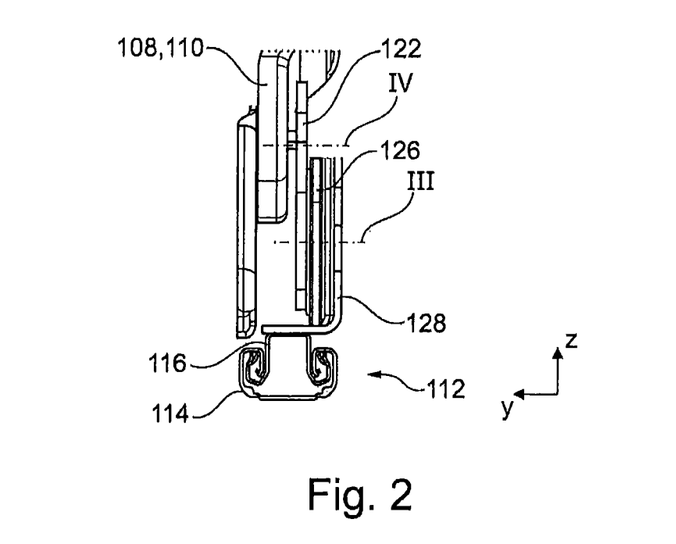
FIG. 2 shows an extract of a front view of the vehicle seat shown in FIG. 1 in an area of a rear link.
Figure 3:
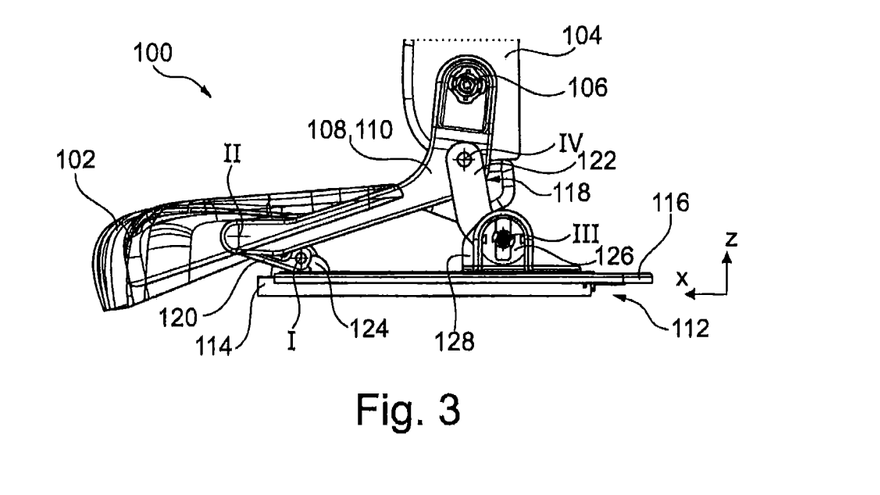
FIG. 3 shows an extract of a side view of the vehicle seat shown in FIG. 1 in an easy entry position.
Figure 4:
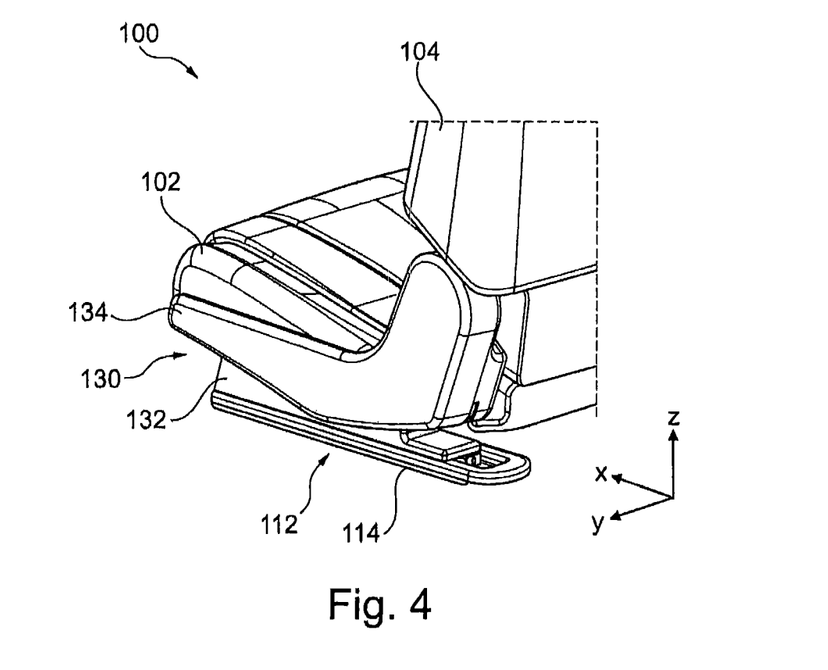
FIG. 4 shows an extract of a perspective view of the vehicle seat shown in FIG. 1 in the use position.
Figure 5:
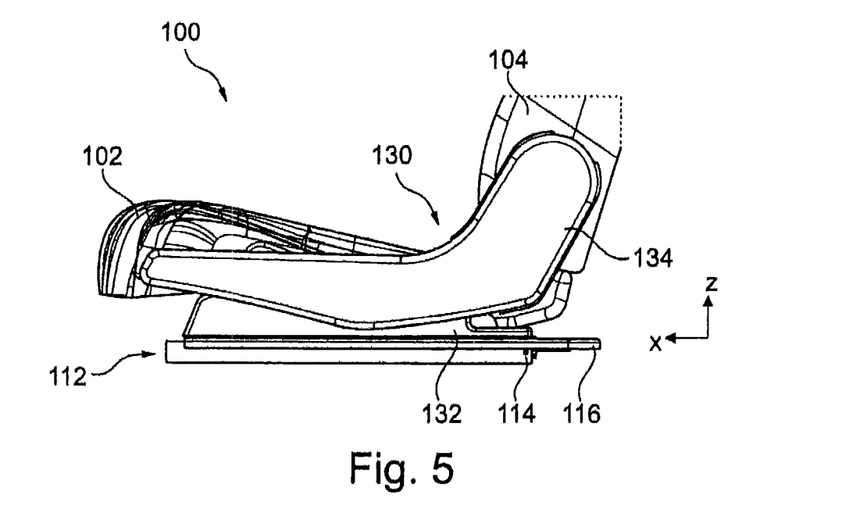
FIG. 5 shows an extract of a side view of the vehicle seat shown in FIG. 1 in the use position.
Figure 6:
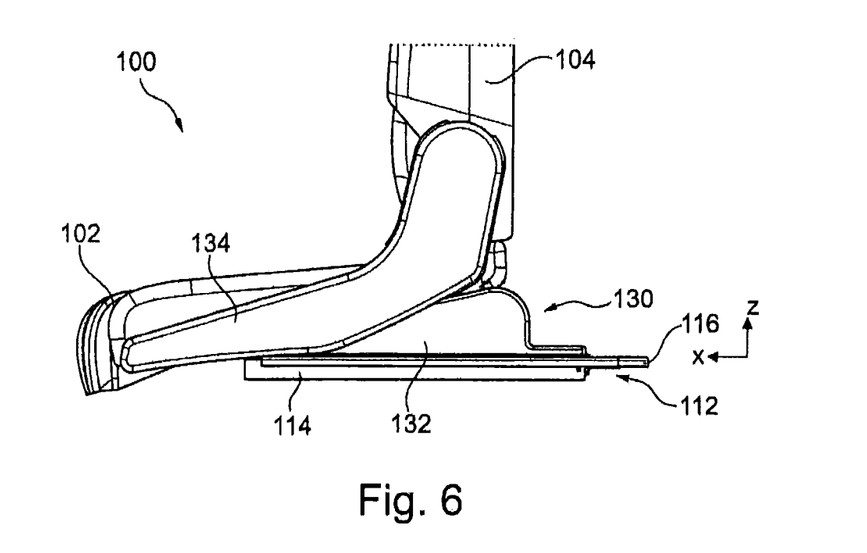
FIG. 6 shows an extract of a side view of the vehicle seat shown in FIG. 1 in the easy entry position.

FIGS. 4 to 6 show the vehicle seat 100 with a cover arrangement 130. The cover arrangement 130 comprises a first cover 132 and a second cover 134.

Viewed from the front, the rear and the side the first cover 132 is covering the front adaptor 124, the rear adaptor 128, the second fitting 126 and at least partly the second seat rail 116, the front link 120 and the rear link 122. The first cover 132 is fixedly connected to the second seat rail 116. The front link 120 and the rear link 122 can move relative to the first cover 132.

Viewed from the front, the rear and the side the second cover 134 is covering the seat frame side member 110, the first fitting 106 and at least partly the rear link 122. The second cover 134 is fixedly connected to the seat frame side member 110. The rear link 122 can move relative to the second cover 134. The second cover 134 can move relative to the first cover 132.

The first cover 132, the second cover 134 and in particular the disc shaped second fitting 126, prevent an occupant to be pinched by seat parts, in particular during the transition from the easy entry position into the use position.

FIGS. 7 to 14 partially show a vehicle seat 200 according to a second embodiment of the invention. The vehicle seat 200 is provided, for example, as an outer seat of a middle or rear seat row of a motor vehicle, for example a van. The vehicle seat 200 has a seat cushion and a backrest, which are not shown in the figures. The backrest is located at the rear end of the seat cushion.

The vehicle seat 200 can be transitioned from a use position to an easy entry position and vice versa. The use position is suitable for transporting a passenger. In the easy entry position, the backrest is in a more upright position and the seat cushion and the backrest are arranged further forward in comparison to the use position.

The backrest is adjustable in its inclination around a swivel axis by means of at least one fitting, in the present case two fittings. Thereby a plurality of use positions of the vehicle seat 200 with different inclinations of the backrest are defined. The two fittings are designed as detent fittings which are known per se from WO 2007/039002 A2 for example, but, in particular in the case of an electrified vehicle seat, could also be designed as geared fittings, which are known from WO 01/12461 A1 for example.

The seat cushion is intended to be understood as meaning, in the present case, a seat cushion carrier and a covered pad. The seat cushion is fixed to a seat frame 202, the seat frame 202 comprising two seat frame side members 204 which are oriented broadly parallel to the longitudinal direction x and two cross tubes or crossmembers which connect the seat frame side members 204. The backrest is fixed on the seat frame 202 by the two fittings.

For simplicity, in the following, only the left vehicle seat side of the vehicle seat 200, which is substantially symmetrical with respect to a plane running parallel to the longitudinal direction and vertically to the transverse direction y, is described, i.e. the components mentioned below, unless described differently, are present in duplicate (optionally mirror-symmetrically). The vehicle seat 200 is first of all described in a special use position, namely the design position, in which the backrest is inclined slightly to the rear, in the present case by approximately 22°, in relation to the vertical direction z.

A base 206 of the vehicle seat 200 is connectable to a vehicle structure of the motor vehicle, for example to the floor of the vehicle body. In the exemplary embodiment, the base 206 is designed as a seat rail arrangement which enables the possibility of a longitudinal adjustment of the vehicle seat 200. In the present case, the base 206 has a first seat rail 208 which is connectable directly to the vehicle structure, and a second seat rail 210 which is displaceable in the longitudinal direction relative to said first seat rail 208. The two seat rails 208 and 210, which have a substantially U-shaped profile, engage one behind the other in an alternating manner by their inwardly and outwardly curved longitudinal edges and are lockable to each other—by means of a rail lock which is known per se.

The seat frame 202 is coupled to the second seat rail 210 by means of a four bar linkage 212. The four bar linkage 212 comprises a front link 214 and a rear link 216. A first swivel joint I connects the front link 214 to a front adaptor 218. The front adaptor 218 is fastened to the second seat rail 210, in particular to a front area of the second seat rail 210. A second swivel joint II connects the front link 214 to the seat frame 202, in particular to a front area of the seat frame side member 204. A third swivel joint III connects the rear link 216 to a rear adaptor 220. The rear adaptor 220 is fastened to the second seat rail 210, in particular to a rear area of the second seat rail 210. A fourth swivel joint IV connects the front link 214 to the seat frame 202, in particular to a rear area of the seat frame side member 204.

In order to provide a lock for the four bar linkage 212, the seat frame side member 204 is lockable in a releasable manner with the rear link 216 by means of a locking device 222. The locking device 222 is designed as a rotary latch lock which is known for example from WO 2004/069580 A2.

Figure 9:
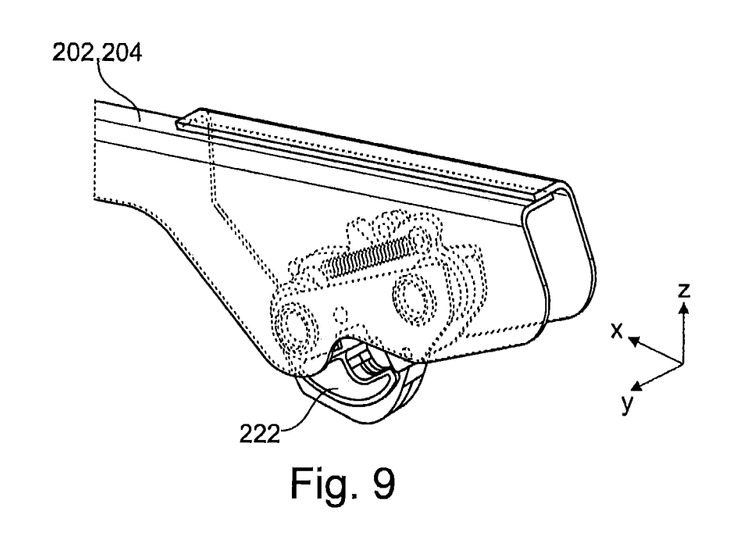
FIG. 9 shows a perspective view of a locking device mounted in a seat frame side member of the vehicle seat shown in FIG. 7.
Figure 10:
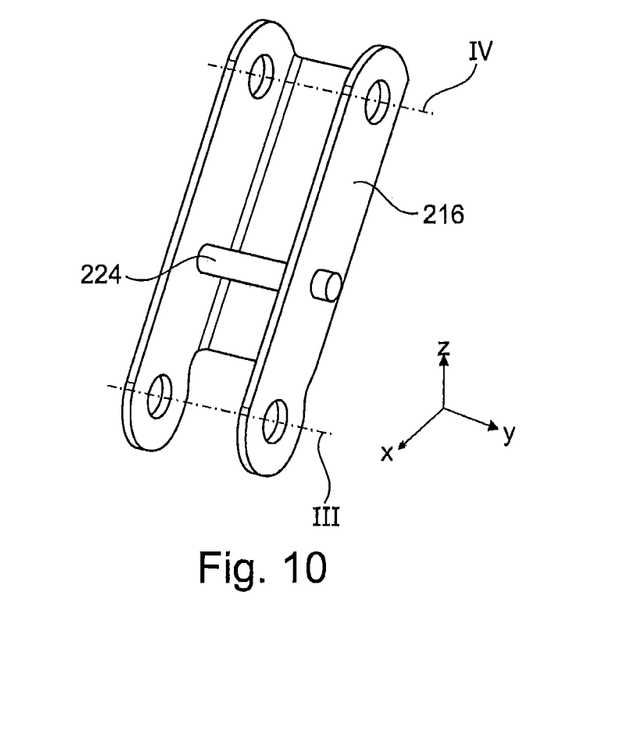
FIG. 10 shows a perspective view of a rear rocker of the vehicle seat shown in FIG. 7.
Figure 11:
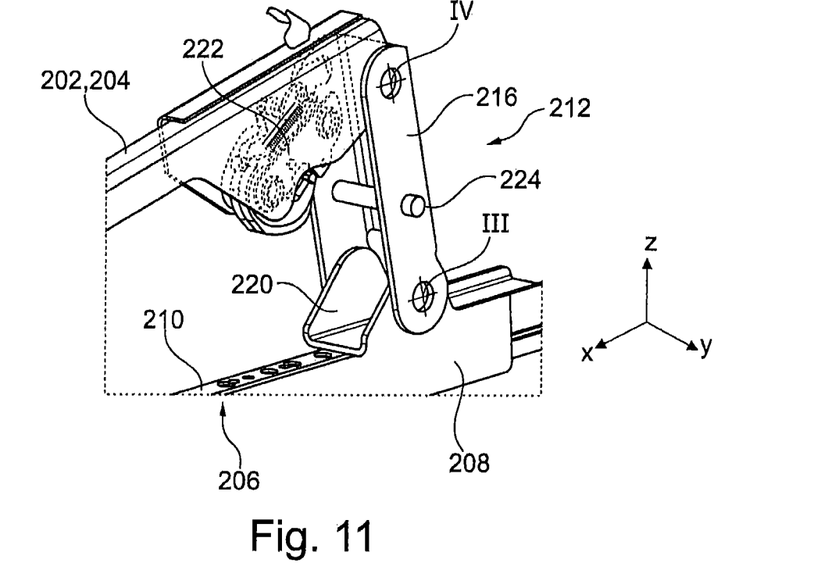
FIG. 11 shows an extract of a perspective view of the vehicle seat shown in FIG. 7 in the easy entry position.

The locking device 222 is connected to the seat frame side member 204. A counter element, in the present case a bolt 224, is mounted on the rear link 216 and is lockable with the locking device 222.

The locking device 222 is fixedly connected to a rear area of the seat frame side member 204. The rear area of the seat frame side member 204 has a U-shaped design which is opened downward. A housing of the locking device 222 is arranged within the U-shaped rear area of the seat frame side member 204.

The counter element, in the present case a bolt 224, is fixedly connected to the rear link 216 in an area between the third swivel joint III and the fourth swivel joint IV. The rear link 216 has a U-shaped design which is opened forward. The bolt 224 is arranged within the U-shaped rear area of the seat frame side member 204.

Figure 7:
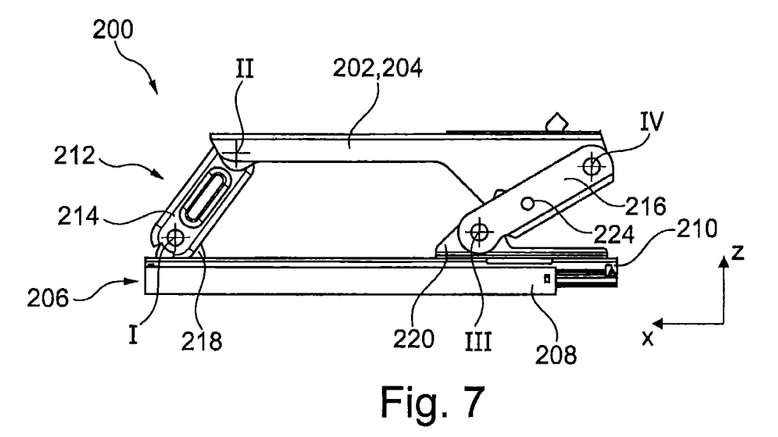
FIG. 7 shows an extract of a side view of a vehicle seat according to a second embodiment of the invention in a use position, wherein a backrest, and a seat cushion of the vehicle seat are not shown.

In the use position the bolt 224 is locked to the locking device 222. Thereby, the rear link 216 is locked to the seat frame side member 204 in the use position. Thereby, in the use position the four bar linkage 216 is locked.

Figure 8:
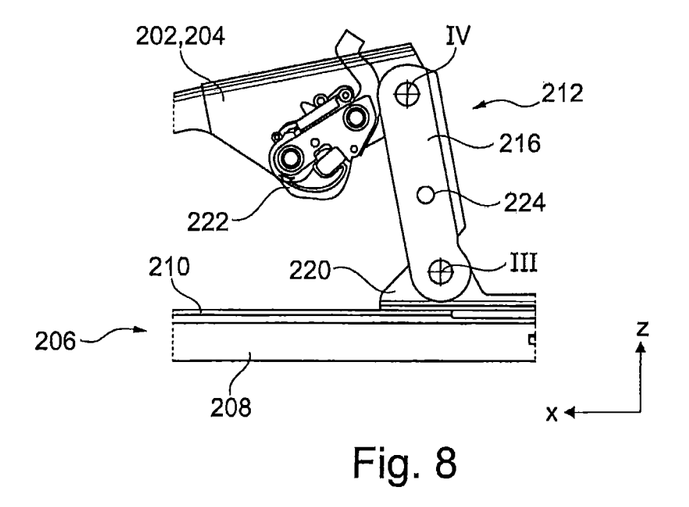
FIG. 8 shows a detail of the vehicle seat shown in FIG. 7 in an easy entry position.

For the transfer of the vehicle seat 200 from the use position into the easy entry position, the locking device 222 is unlocked in such a way that the bolt 224 can exit from the locking device 222. Thereby the four bar linkage 216 is unlocked. During the transition of the vehicle seat 200 from the use position into the easy entry position, the rear link 216 pivots around the third swivel joint III and moves the seat frame 202 in a more forward direction.

During the transition from the use position into the easy entry position, the locking of the seat rails 208 and 210 can be unlocked and therefore the second seat rail 210 is movable forward, which additionally increases the space behind the vehicle seat 200, i.e. an entry size, and facilitates the access to a rear seat row behind the vehicle seat 200. When the easy entry position, in which the access to the rear seat row behind the vehicle seat 200 is facilitated, is reached, an additional locking device, which is not shown in the figures, can optionally secure the easy entry position. The return into the previously adopted use position takes place in the reverse order.

For a transfer of the vehicle seat 200 from the use position into a floor position as a further non-use position in which an increased loading space is available, the backrest folded forward after the two fittings are unlocked or adjusted accordingly. Preferably the rail lock remains locked in the floor position.

Figure 12:
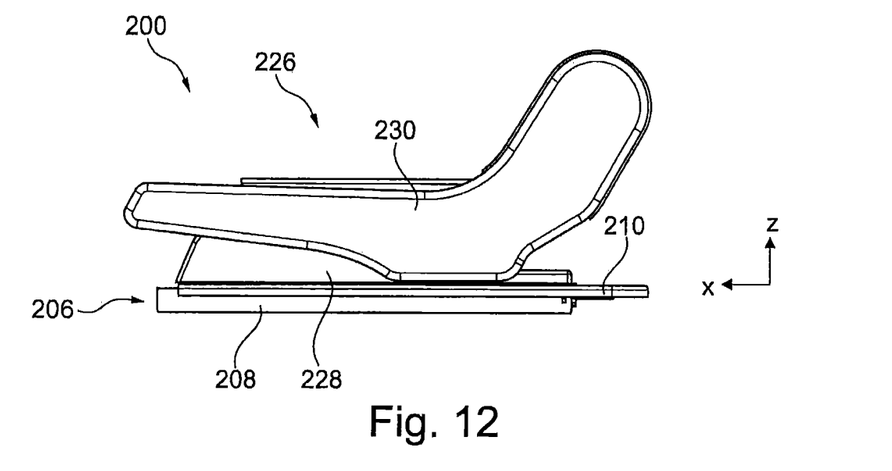
FIG. 12 shows an extract of a side view of the vehicle seat shown in FIG. 7 in the use position, wherein a backrest and a seat cushion of the vehicle seat are not shown.
Figure 13:
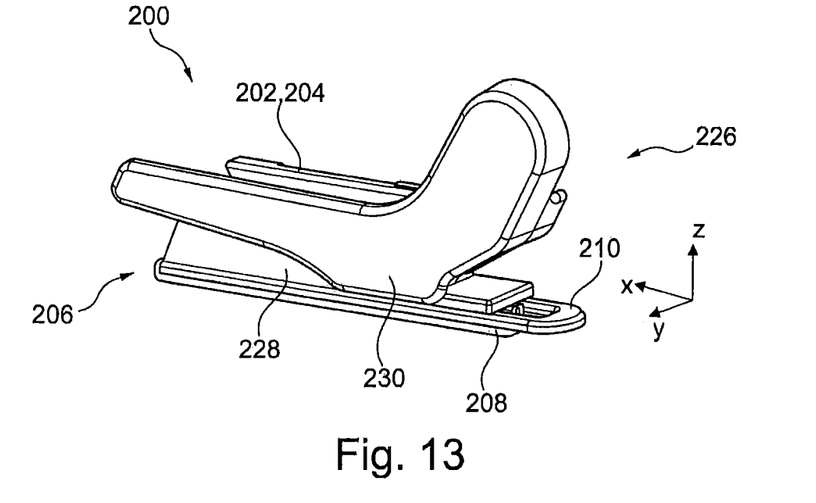
FIG. 13 shows an extract of a perspective view of the vehicle seat shown in FIG. 7 in the use position.
Figure 14:
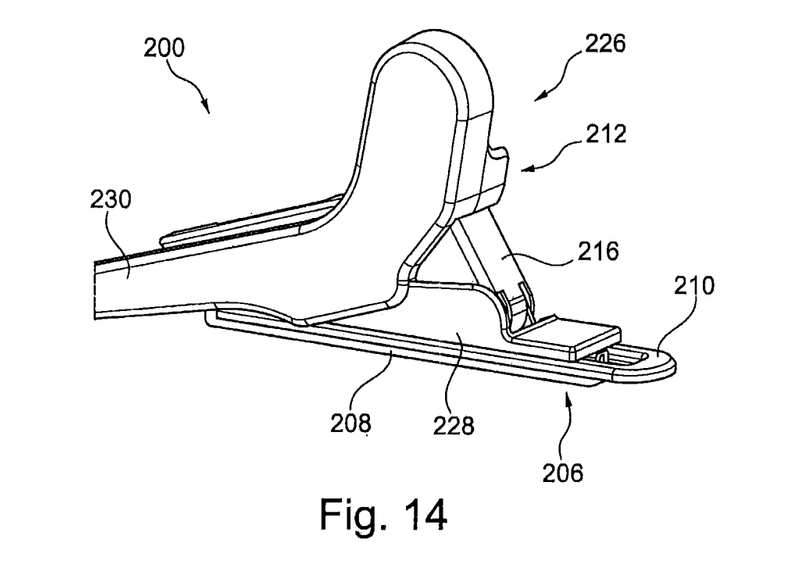
FIG. 14 shows an extract of a perspective view of the vehicle seat shown in FIG. 7 in the easy entry position.

FIGS. 12 to 14 show the vehicle seat 200 with a cover arrangement 226. The cover arrangement 226 comprises a first cover 228 and a second cover 230.

Viewed from the front, the rear and the side the first cover 228 is covering the front adaptor 218, the rear adaptor 220 and at least partly the second seat rail 210. The first cover 228 is fixedly connected to the second seat rail 210. The front link 214 and the rear link 216 can move relative to the first cover 228.

Viewed from the front, the rear and the side the second cover 230 is covering the seat frame side member 204, the locking device 222 and at least partly the rear link 216. The second cover 230 is fixedly connected to the seat frame side member 204. The rear link 219 can move relative to the second cover 230. The second cover 230 can move relative to the first cover 228.

The first cover 228, the second cover 230 and the arrangement of the locking device in the area of the seat frame side member 204, in particular in the U-shaped rear area of the seat frame side member 204, prevent an occupant to be pinched by seat parts, in particular during the transition from the easy entry position into the use position.

Although the invention has been described in detail in the drawings and in the illustration above, the illustrations should be understood as being illustrative and exemplary, and not as restrictive. In particular, the selection of the proportions of the individual elements illustrated in the drawings should not be interpreted as being necessary or restrictive. Furthermore, the invention is in particular not restricted to the exemplary embodiments discussed. Further variants of the invention and their embodiment will be apparent to a person skilled in the art from the above disclosure, from the figures and from the claims.

LIST OF REFERENCES 100 vehicle seat
102 seat cushion
104 backrest
106 first fitting
108 seat frame
110 seat frame side member
112 base
114 first seat rail
116 second seat rail
118 four bar linkage
120 front link
122 rear link
124 front adaptor
126 second fitting
128 rear adaptor
130 cover arrangement
132 first cover
134 second cover
200 vehicle seat
202 seat frame
204 seat frame side member
206 base
208 first seat rail
210 second seat rail
212 four bar linkage
214 front link
216 rear link
218 front adaptor
220 rear adaptor
222 locking device
224 counter element, bolt
226 cover arrangement
228 first cover
230 second cover
I first swivel joint
II second swivel joint
III third swivel joint
IV fourth swivel joint
S swivel axis
x longitudinal direction y transverse direction
z vertical direction

What is claimed is:

1. A vehicle seat adapted to be transferable from at least one use position, which is suitable for transporting a passenger, into an easy entry position as a non-use position, and back, comprising:
    a seat cushion,
    a backrest,
    a seat frame, the seat cushion and the backrest being coupled to the seat frame,
    a base, and
    a kinematics for the articulated connection of the seat frame to the base,
    wherein the kinematics comprises at least one link articulated connecting the seat frame to the base, wherein the at least one link is lockable with the seat frame by a locking device,
    wherein the locking device is designed as a rotary latch lock for receiving and locking a counter element,
    wherein the locking device is fixedly connected to the seat frame and the counter element is fixedly connected to the at least one link,
    wherein the counter element is arranged within a U-shaped profile of the at least one link.

2. The vehicle seat according to claim 1, wherein the kinematics is a four bar linkage.

3. The vehicle seat according to claim 2, wherein the four bar linkage comprises a front link and a rear link; the front link being connected to the base by a first swivel joint and the front link being connected to the seat frame by a second swivel joint; the rear link being connected to the base by a third swivel joint and the rear link being connected to the seat frame by a fourth swivel joint.

4. The vehicle seat according to claim 1, wherein the counter element is designed as a bolt.

5. The vehicle seat according to 1, wherein a cover is covering the locking device and at least partly the rear link, the rear link being pivotable relative to the cover.

* * * * *